United States Patent
Hatanaka et al.

(10) Patent No.: US 9,771,104 B2
(45) Date of Patent: Sep. 26, 2017

(54) TORQUE DETECTION DEVICE, ELECTRIC POWER STEERING DEVICE, AND VEHICLE

(71) Applicant: NSK Ltd., Shinagawa-ku, Tokyo (JP)

(72) Inventors: Kazuyuki Hatanaka, Fujisawa (JP); Sumio Sugita, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/329,774

(22) PCT Filed: May 9, 2016

(86) PCT No.: PCT/JP2016/063710
§ 371 (c)(1),
(2) Date: Jan. 27, 2017

(87) PCT Pub. No.: WO2016/181923
PCT Pub. Date: Nov. 17, 2016

(65) Prior Publication Data
US 2017/0210416 A1    Jul. 27, 2017

(30) Foreign Application Priority Data
May 14, 2015 (JP) ................................ 2015-099017

(51) Int. Cl.
*G01L 3/00* (2006.01)
*B62D 6/10* (2006.01)
(Continued)

(52) U.S. Cl.
CPC ................. *B62D 6/10* (2013.01); *B62D 5/04* (2013.01); *B62D 5/0463* (2013.01); *G01L 3/10* (2013.01)

(58) Field of Classification Search
CPC .......... B62D 6/10; B62D 5/04; B62D 5/0463; G01L 3/10
(Continued)

(56) References Cited

U.S. PATENT DOCUMENTS

| | | | | |
|---|---|---|---|---|
| 5,124,602 A | * | 6/1992 | Nishimura | ............. H02K 23/66 310/155 |
| 5,521,495 A | * | 5/1996 | Takahashi | ................ G01B 7/30 324/207.18 |

(Continued)

FOREIGN PATENT DOCUMENTS

| | | |
|---|---|---|
| JP | 10-78358 A | 3/1998 |
| JP | 11-248561 A | 9/1999 |

(Continued)

OTHER PUBLICATIONS

International Search Report (PCT/ISA/210) issued in PCT Application No. PCT/JP2016/063710 dated Jul. 26, 2016 with English translation (five pages).

(Continued)

*Primary Examiner* — Max Noori
(74) *Attorney, Agent, or Firm* — Crowell & Moring LLP (57) ABSTRACT

To provide a torque detection device which allows less deformation of detection coils than in the conventional techniques in axially pressing and holding in yokes, coil bobbins around which the detection coils are wound. A torque sensor includes a pair of coils, coil bobbins around which the coils are respectively wound, yokes which respectively hold the coil bobbins, one yoke cover fitted by pressing into inner diameters of the yokes, and pressing portions which are formed to project radially and outward at a plurality of circumferential positions of a radial outer end portion of respective flange portions of the coil bobbins, and act between the coil bobbins to axially press the coil bobbins during assembly.

7 Claims, 9 Drawing Sheets

(51) Int. Cl.
*B62D 5/04* (2006.01)
*G01L 3/10* (2006.01)

(58) Field of Classification Search
USPC ...................................................... 73/862.08
See application file for complete search history.

(56) References Cited

U.S. PATENT DOCUMENTS

| | | | |
|---|---|---|---|
| 5,796,014 A | 8/1998 | Chikaraishi et al. | |
| 6,301,975 B1* | 10/2001 | Chikaraishi | G01L 3/105 |
| | | | 73/862 |
| 2002/0129667 A1 | 9/2002 | Jong et al. | |
| 2006/0034670 A1* | 2/2006 | Sugita | B23B 31/265 |
| | | | 409/231 |
| 2006/0118351 A1* | 6/2006 | Chikaraishi | B62D 6/10 |
| | | | 180/443 |
| 2007/0193372 A1* | 8/2007 | Shimizu | G01L 3/102 |
| | | | 73/862.333 |
| 2009/0218162 A1* | 9/2009 | Miyoshi | G01L 3/102 |
| | | | 180/443 |

FOREIGN PATENT DOCUMENTS

| | | |
|---|---|---|
| JP | 2002-274399 A | 9/2002 |
| JP | 3346268 B2 | 11/2002 |
| JP | 2007-292522 A | 11/2007 |
| JP | 2014-102191 A | 6/2014 |

OTHER PUBLICATIONS

Japanese-language Written Opinion (PCT/ISA/237) issued in PCT Application No. PCT/JP2016/063710 dated Jul. 26, 2016 with English translation (six pages).

* cited by examiner

TORQUE DETECTION DEVICE, ELECTRIC POWER STEERING DEVICE, AND VEHICLE

TECHNICAL FIELD

The present invention relates to a torque detection device which detects a torque generated in a rotating shaft, an electric power steering device including the torque detection device, and a vehicle.

BACKGROUND ART

Conventionally, a technique disclosed in, for example, PTL 1 is available as a technique for holding detection coils constituting a torque detection device in yokes. In this technique, protrusions are formed on the peripheral edge portion of the end face of coil bobbins, and the coil bobbins around which the detection coils are wound are clamped between yokes and a cover yoke to allow the yoke bottom surfaces and the protrusions to abut against each other so that the end faces of the coil bobbins bend. Backlash between the coil bobbins and the yoke bottom surfaces is filled by restoring forces acting upon the bending, to hold the coils in the yokes.

CITATION LIST

Patent Literature

PTL 1: Japanese Patent No. 3346268

SUMMARY OF INVENTION

Technical Problem

Unfortunately, in the above-mentioned technique disclosed in PTL 1, since the end faces of the coil bobbins are bent and held by protrusions formed on the peripheral edge portions of these end faces, the electrical characteristics of the detection coils (coil windings) may change and vary due to deformation of the detection coils upon the bending. It is, therefore, necessary to improve the dimensional accuracy of the yokes and the coil bobbins.

In view of this, the present invention has been made by focusing attention on the problem to be solved of such conventional techniques, and has as its object to provide a torque detection device which allows less deformation of detection coils than in the conventional techniques in axially pressing and holding in yokes, coil bobbins around which the detection coils are wound, an electric power steering device including the torque detection device, and a vehicle.

Solution to Problem

In order to achieve the object mentioned above, according to an aspect of the present invention, there is provided a torque detection device including: a pair of detection coils, impedances of which change in a direction opposite to each other depending on a torque generated in a rotating shaft; a torque calculation circuit configured to calculate the torque on the basis of voltages output from the detection coils; two reel coil bobbins around which the pair of detection coils are respectively wound; two electromagnetic yokes including cylindrical portions which respectively hold the two coil bobbins fitted thereinto; one yoke cover fitted by pressing into inner diameters of the cylindrical portions of the two electromagnetic yokes at an intermediate position between the two electromagnetic yokes axially opposed to each other; and pressing portions which are formed to project radially and outward at a plurality of circumferential positions of a radial outer end portion of respective flange portions of the two coil bobbins, and act between the two coil bobbins to axially press the two coil bobbins during assembly.

Furthermore, in order to achieve the object mentioned above, according to another aspect of the present invention, there is provided a power steering device including the above-mentioned torque detection device.

Furthermore, in order to achieve the object mentioned above, according to still another aspect of the present invention, there is provided a vehicle including the above-mentioned torque detection device.

Advantageous Effects of Invention

With the torque detection device according to the present invention, the two coil bobbins can be axially pressed during assembly by pressing portions formed in the flange portion of each coil bobbin to project radially outwards from the radial outer end portion of this flange portion. This allows stable holding of the coil bobbins in the electromagnetic yokes without directly deforming the end faces of the coil bobbins. This, in turn, allows less deformation of the detection coils than in the conventional techniques in holding, thereby reducing changes and variations in electrical characteristic of the detection coils due to the deformation.

An electric power steering device including the above-mentioned torque detection device can achieve highly reliable steering assist control. A vehicle including the above-mentioned torque detection device achieves highly reliable steering assist control and variable speed control by applying this torque detection device to, for example, an onboard electric power steering device or gearbox.

DESCRIPTION OF THE EMBODIMENTS

First to third embodiments of the present invention will now be described with reference to the drawings. In the following description of the drawings, the same or similar reference numerals denote the same or similar portions. However, it should be noted that the drawings are schematic, and illustrate members or portions with vertical and horizontal dimensions and scales different from the actual ones. Therefore, specific dimensions and scales should be determined in consideration of the following description. The drawings also include portions having different dimensional relationships and ratios between them, as a matter of course.

The following first to third embodiments illustrate a device or a method for embodying the technical idea of the present invention, and the technical idea of the present invention is not intended to specify the materials, shapes, structures, arrangements, and the like of components to the following specific examples. Various changes may be made to the technical idea of the present invention within the technical scope defined by claims described in the scope of claims.

First Embodiment (Configuration)

Figure 1:
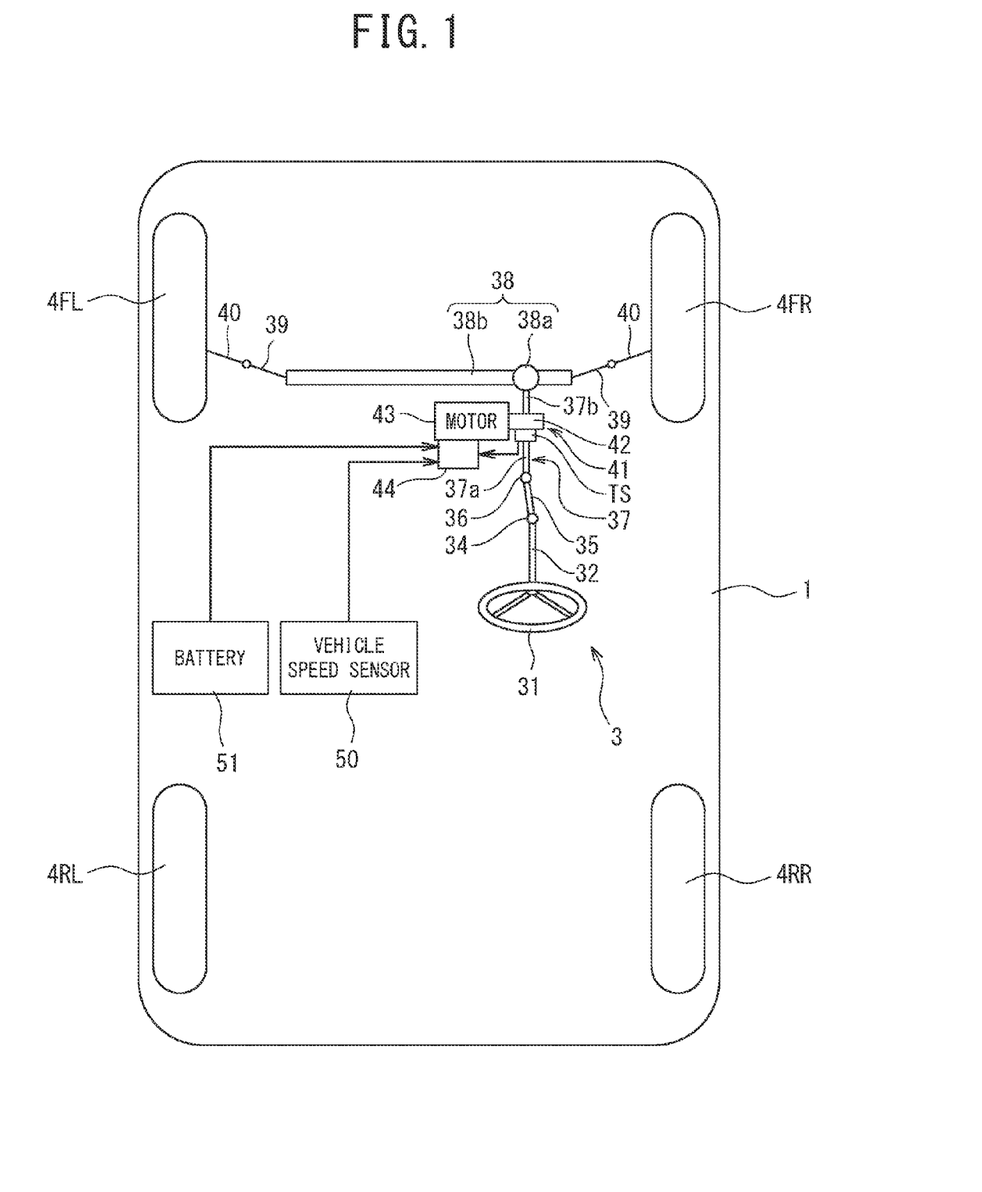
FIG. 1 is an overall configuration diagram when an electric power steering device equipped with a torque detection device according to the present invention is applied to a vehicle.

A vehicle 1 according to a first embodiment includes front wheels 4FR and 4FL serving as left and right steered wheels, and rear wheels 4RR and 4RL, as illustrated in FIG. 1. The front wheels 4FR and 4FL are turned by an electric power steering device 3.

The electric power steering device 3 includes a steering wheel 31, a steering shaft 32, a torque sensor TS, a first universal joint 34, a lower shaft 35, and a second universal joint 36, as illustrated in FIG. 1.

The electric power steering device 3 further includes a pinion shaft 37, a steering gear 38, tie rods 39, and knuckle arms 40.

A steering force acting on the steering wheel 31 by the operation of the driver is transmitted to the steering shaft 32.

The steering force transmitted to the steering shaft 32 is further transmitted to the lower shaft 35 via the first universal joint 34 and to the pinion shaft 37 via the second universal joint 36. The pinion shaft 37 includes an input shaft 37a and an output shaft 37b. The input shaft 37a has its one end connected to the second universal joint 36 and its other end connected to one end of the output shaft 37b via a torsion bar 30 (to be described later). The steering force transmitted to the output shaft 37b is further transmitted to the tie rods 39 via the steering gear 38. The steering forces transmitted to the tie rods 39 are further transmitted to the knuckle arms 40 to turn the front wheels 4FR and 4FL.

The steering gear 38 employs a rack-and-pinion system including a pinion 38a connected to the output shaft 37b of the pinion shaft 37 and a rack 38b which meshes with the pinion 38a. The steering gear 38 converts a rotational motion transmitted to the pinion 38a into a rectilinear motion in the vehicle widthwise direction in the rack 38b.

A steering assist mechanism 41 which transmits a steering assist force to the output shaft 37b of the pinion shaft 37 is connected to the output shaft 37b.

The steering assist mechanism 41 includes a reduction gear 42 which is connected to the output shaft 37b and includes a worm gear mechanism, an electric motor 43 which is connected to the reduction gear 42 and generates a steering assist force, and an EPS control unit 44 fixed and supported on the housing of the electric motor 43.

The electric motor 43 is implemented in a three-phase brushless motor and includes an annular motor rotor and an annular motor stator (neither is illustrated). The motor stator includes a plurality of circumferentially equidistant pole teeth projecting radially outwards, and a magnetic exciting coil is wound around each pole tooth. The motor rotor is coaxially placed outside the motor stator. The motor rotor includes a plurality of circumferentially equidistant magnets arranged on its inner peripheral surface and is opposed to the pole teeth of the motor stator with slight aperture (air gaps) between them.

The motor rotor is fixed to a motor rotating shaft and rotates upon magnetic excitation of each of the teeth of the motor stator in a predetermined sequence by supplying a three-phase AC current to the coil of the motor stator via the EPS control unit 44. Accordingly, the motor rotating shaft rotates with this rotation.

The EPS control unit 44 includes a controller and a motor driving circuit (neither is illustrated). The EPS control unit 44 receives a steering torque T detected by the torque sensor TS, a vehicle speed V detected by a vehicle speed sensor 50, and a direct current from a battery 51 serving as a DC voltage source, as illustrated in FIG. 1.

The torque sensor TS detects the steering torque T applied to the steering wheel 31 and transmitted to the input shaft 37a.

The structure of the main part of the electric power steering device will be described in detail below with reference to FIG. 2.

Figure 2:
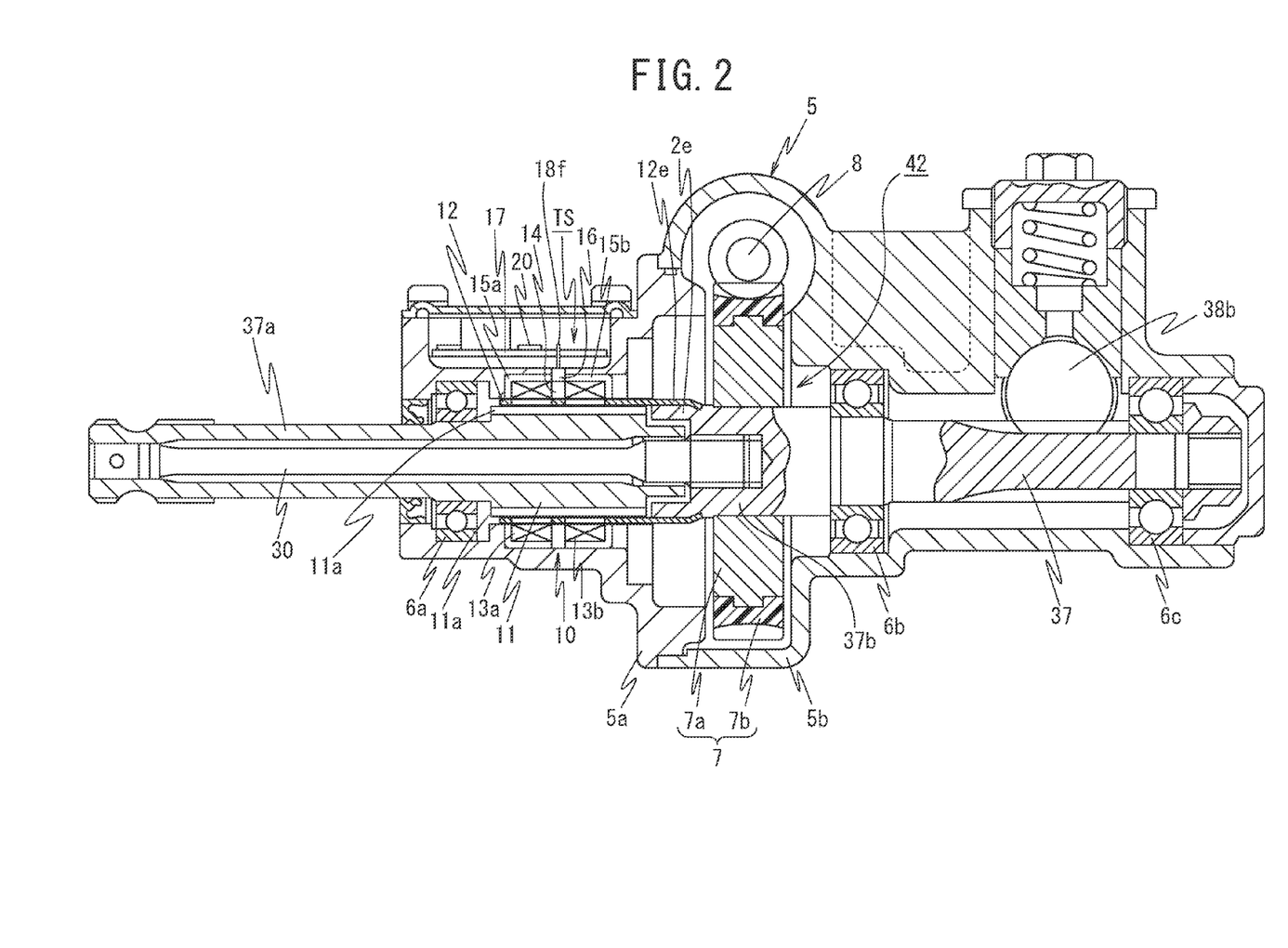
FIG. 2 is a sectional view illustrating the main part of the electric power steering device including the torque detection device according to the present invention.

Referring to FIG. 2, reference numeral 5 denotes a housing, which is divided into two parts: an input shaft-side housing portion 5a and an output shaft-side housing portion 5b. The input shaft 37a is rotatably supported by a bearing 6a in the input shaft-side housing portion 5a. The output shaft 37b is rotatably supported by bearings 6b and 6c in the output shaft-side housing portion 5b.

The input shaft 37a and the output shaft 37b are connected to each other via the torsion bar 30 placed in the input shaft 37a.

The input shaft 37a, the torsion bar 30, and the output shaft 37b are coaxially arranged such that the input shaft 37a and the torsion bar 30 are connected to each other by a pin joint and the torsion bar 30 and the output shaft 37b are connected to each other by a spline joint.

A worm wheel 7 which rotates coaxially and integrally with the output shaft 37b is fixed to the output shaft 37b and meshes with a worm 8 driven by the electric motor 43, in the output shaft-side housing portion 5b. In the worm wheel 7, a synthetic-resin tooth portion 7b is integrally fixed to a metal hub 7a. The rotational force of the electric motor 43 is transmitted to the output shaft 37b via the worm 8 and the worm wheel 7, and a steering assist torque is applied to the output shaft 37b in an arbitrary direction by appropriately switching the rotational direction of the electric motor 43.

The structure of a torque detection unit 10 of the torque sensor (torque detection device) TS that detects a torque acting between the input shaft 37a and the output shaft 37b will be described below.

The torque detection unit 10 includes a sensor shaft portion 11 formed in the input shaft 37a, a pair of coils 13a and 13b located inside the input shaft-side housing portion 5a, and a cylindrical member 12 located between the sensor shaft portion 11 and the pair of coils 13a and 13b.

Figure 3:
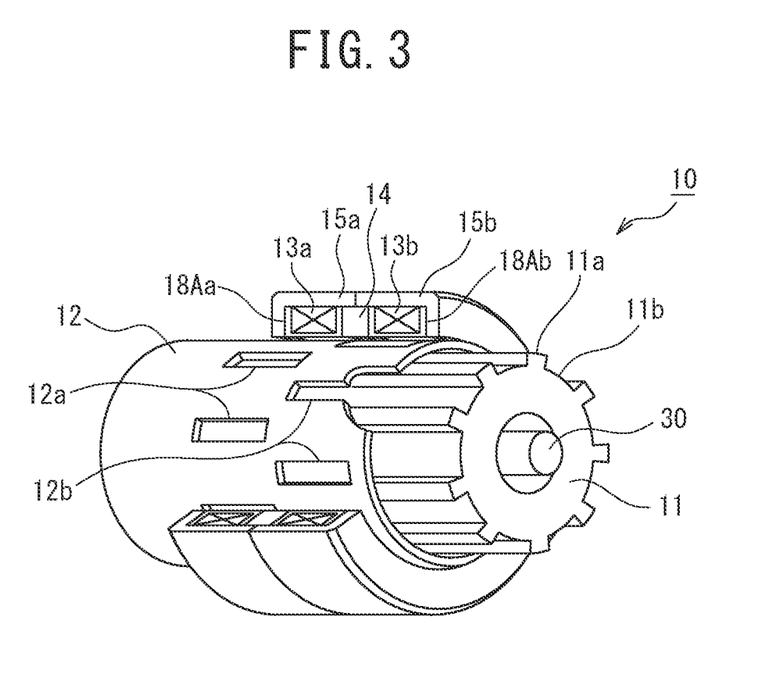
FIG. 3 is a view illustrating the structure of a torque detection unit.

The sensor shaft portion 11 is made of a magnetic material, and a plurality of (in the example illustrated in FIG. 3, nine) axially extending raised lines 11a are circumferentially equidistantly formed on the surface of the sensor shaft portion 11, as illustrated in FIG. 3. Groove portions 11b are formed between the raised lines 11a.

A cylindrical member 12 made of a conductive nonmagnetic material, such as aluminum, is located outside the sensor shaft portion 11 coaxially with the sensor shaft portion 11 in close vicinity to the sensor shaft portion 11, and an extending portion 12e of the cylindrical member 12 is fixed to the exterior of an end portion 2e of the output shaft 37b, as illustrated in FIG. 2.

The cylindrical member 12 includes a first window line including a plurality of (nine in FIG. 3) circumferentially equidistant rectangular windows 12a arranged at the positions opposite to the raised lines 11a on the surface of the sensor shaft portion 11 described above, and a second window line including a plurality of (nine in FIG. 3) rectangular windows 12b which are arranged at positions axially shifted from the first window line, the same in shape, and different in circumferential phase from the windows 12a.

Yokes 15a and 15b which hold coil bobbins 18 around which the coils 13a and 13b having the same standards are wound surround the outer periphery of the cylindrical member 12. In other words, the coils 13a and 13b are located coaxially with the cylindrical member 12, the coil 13a surrounds the first window line portion including the windows 12a, and the coil 13b surrounds the second window line portion including the windows 12b.

The yokes 15a and 15b are fixed into the input shaft-side housing portion 5a, as illustrated in FIG. 2. The output lines of the coils 13a and 13b are inserted into board through-holes and connected by soldering while the coil distal end portions are bound and soldered to coil-side terminals fitted into the coil bobbins 18 by pressing. Note that electronic components forming an electrical circuit in the circuit board 17 are mounted on the surface by reflow soldering, lead soldering, or the like.

Figure 4:
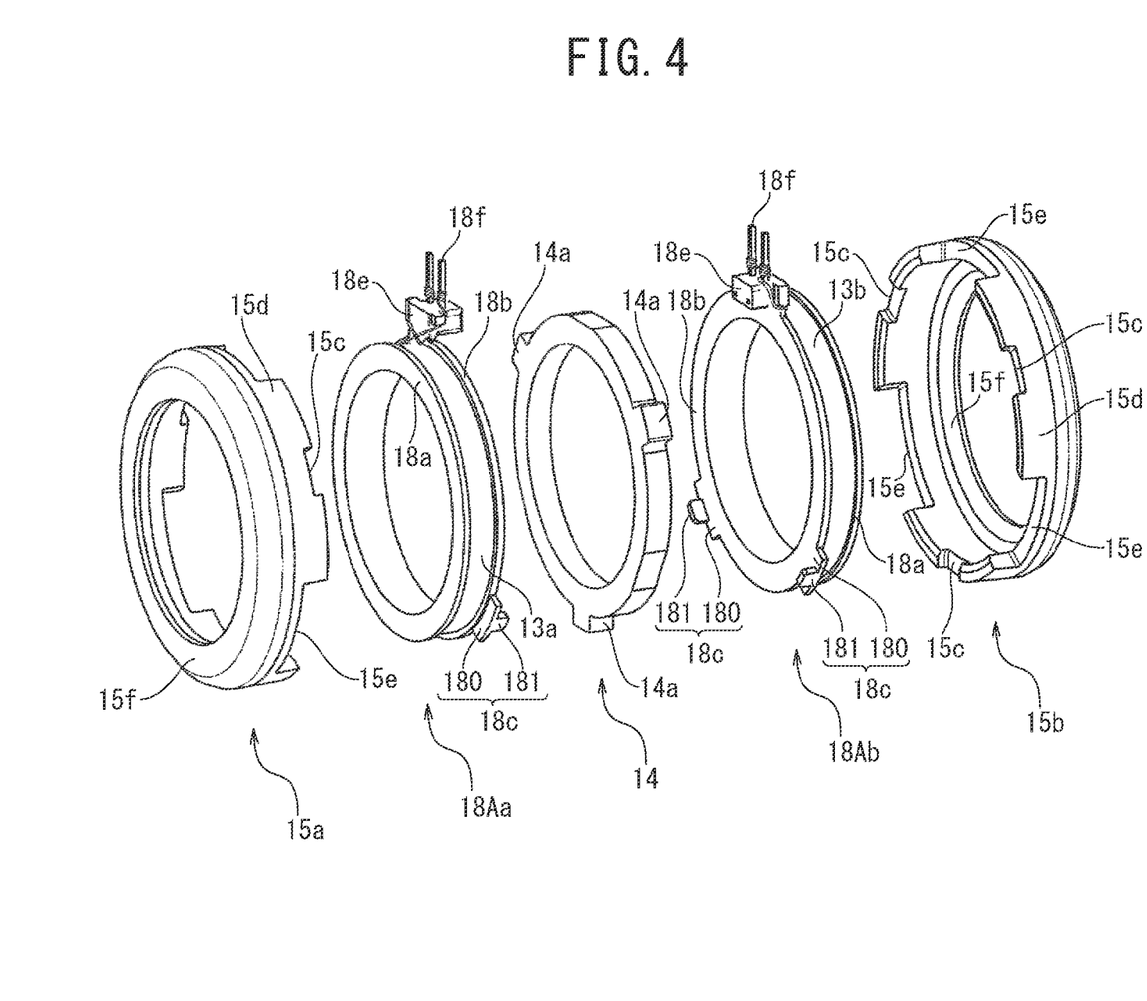
FIG. 4 is an exploded perspective view illustrating members included in the torque detection unit according to a first embodiment.

FIG. 4 is a perspective view illustrating members included in the torque detection unit 10.

Coil bobbins 18Aa and 18Ab according to the first embodiment are reel members made of a non-conductor such as plastic and are fixed to the input shaft-side housing portion 5a coaxially with the input shaft 37a and the output shaft 37b. The coil bobbins 18Aa and 18Ab include a pair of flange portions 18a and 18b. The coil 13a is wound around the groove portion between the flange portions 18a and 18b of the coil bobbin 18Aa, and the coil 13b is wound around the groove portion between the flange portions 18a and 18b of the coil bobbin 18Ab.

In the torque detection unit 10 according to the first embodiment, two coil bobbins 18Aa and 18Ab which have the same shape and around which the coils 13a and 13b, respectively, are wound are used while facing each other.

The coil bobbins 18Aa and 18Ab will sometimes be referred to as "coil bobbins 18A" hereinafter when their distinction is unnecessary.

A terminal mount portion 18e (to be described later) is formed at the end portion of the side surface of the flange portion 18b, and two pressing portions 18c are axisymmetrically formed to have, as their axis of symmetry, a perpendicular passing through the center of the coil bobbin 18A while the terminal mount portion 18e is set at the upper end portion of the coil bobbin 18A. With this structure, the coil bobbins 18Aa and 18Ab can be uniformed.

The pressing portion 18c includes a rectangular flat base portion 180 formed by one part of the flange portion 18b projecting radially outward, and a rectangular flat lug portion 181 formed to project outward in the axial direction of the coil bobbin 18A from the circumferential central position of the radial outer end portion of the base portion 180.

In other words, in the two coil bobbins 18A with the flange portions 18b opposed to each other on the same axis, the distal end portions of their lug portions 181 are axially opposed to each other.

The axial length of the respective lug portion 181 of the coil bobbins 18Aa and 18Ab is set to allow their axial end portions to abut against each other and push with each other during assembly. This length is designed to enable obtaining axial press forces necessary for stably holding the coil bobbins 18Aa and 18Ab in the yokes 15a and 15b.

The number of pressing portions 18c is selectable as appropriate as long as at least two pressing portions 18c are provided to one coil bobbin 18A.

The terminal mount portion 18e is a nearly rectangular parallelepiped member projecting further radially and outward from the upper end portion of the side surface of the flange portion 18b, and two terminals 18f to be connected to a circuit board 17 are fixed to its upper surface by press fitting. The two coil-side terminals 18f are arranged in parallel and fixed to project radially and outward from the upper surface of the terminal mount portion 18e.

The yokes 15a and 15b are members having the same shape, and each includes a cylindrical portion 15d to externally fit onto the coil bobbin 18A, accommodation portions 15e which accommodate the pressing portions 18c and the terminal mount portion 18e axially and inside upon being fixing to the coil bobbin 18A, and a ring-shaped bottom portion 15f formed at the end portion facing axially and outward. The inner diameter of the bottom portion 15f is equal in size to that of the groove portion of the coil bobbin 18A.

The yokes 15a and 15b include three recessed portions 15c formed to the end portion at a side opposite to the bottom portion 15f of the cylindrical portion 15d with circumferential spacing among them by predetermined angles (circumferentially equidistantly in the first embodiment). Two of the three recessed portions 15c are axisymmetrically formed to have, as their axis of symmetry, a perpendicular passing through the center of the coil bobbin 18A while the terminal mount portion 18e is set at the upper end portion of the coil bobbin 18A. The three recessed portions 15c are not limited to be circumferentially equidistant recessed portions, and they may be arranged at different intervals.

A yoke cover 14 is a nearly ring-shaped member and includes three protruding portions 14a formed on its outer peripheral surface with circumferential spacing among them by predetermined angles. The yoke cover 14 is fitted by pressing into the inner diameters of the cylindrical portions 15d of the yokes 15a and 15b with the protruding portions 14a being fitted into the recessed portions 15c of the yokes 15a and 15b.

In other words, the depth of press fitting at which the yoke cover 14 is fitted into the yokes 15a and 15b by pressing is regulated by the protruding portions 14a of the yoke cover 14 and the recessed portions 15c of the yokes 15a and 15b. More specifically, the axial depths of the recessed portions 15c formed in the yokes 15a and 15b are set about half of the thickness of the yoke cover 14, including manufacturing tolerances.

Although three protruding portions 14a and three recessed portions 15c are provided in this case, the numbers and angles of protruding portions 14a and recessed portions 15c to be formed can be set as appropriate.

The circuit board 17 is provided with through-holes for coil-side terminal connection (not illustrated). Electrical connection between the torque detection unit 10 and the circuit board 17 can be established by inserting the coil-side terminals 18f into the through-holes for coil-side terminal connection and connecting them by soldering while the coil distal end portions are bound and soldered to the coil-side terminals 18f fitted into the coil bobbins 18A by pressing. As another method, a board-side connector having a female terminal may be mounted on the circuit board 17 and a guide portion or the like may be mounted on the terminal mount portion 18e to form a coil-side connector, which may be connected to the board-side connector in the direction of board thickness to establish electrical connection.

In assembling a torque detection unit 10, first, coils 13a and 13b are wound around the coil bobbins 18Aa and 18Ab, respectively. When the coil 13a is wound around the coil bobbin 18Aa, the distal end portion of the coil 13a is bound and fixed by soldering or TIG-welding to one coil-side terminal 18f. The coil 13a is wound around the groove portion of the coil bobbin 18Aa and its terminal end portion is then bound and fixed by soldering or TIG-welding to the other coil-side terminal 18f. The same applies to the coil 13b and the coil bobbin 18Ab.

The coil bobbins 18Aa and 18Ab around which the coils 13a and 13b are wound are fitted into the yokes 15a and 15b, respectively. The coil bobbins 18Aa and 18Ab are arranged so as to make their flange portions 18b face with each other with the yoke cover 14 interposed between them, and the yokes 15a and 15b are fitted to the yoke cover 14 from the two axial sides by pressing.

Figure 5:
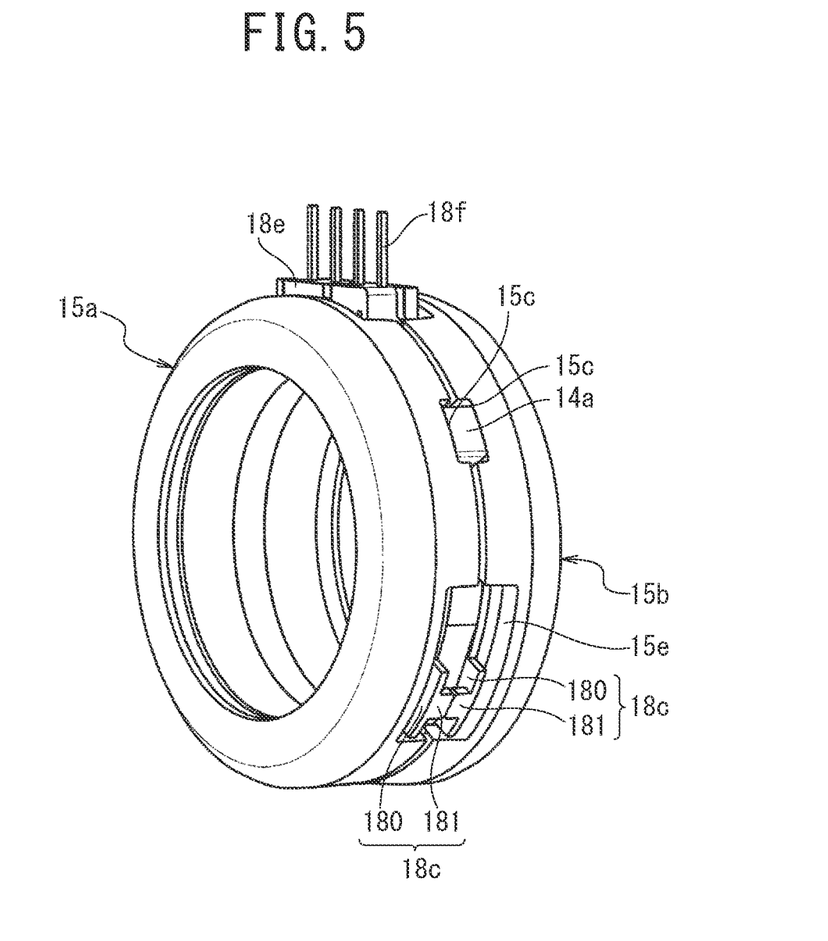
FIG. 5 is a perspective view illustrating how the torque detection unit according to the first embodiment has been assembled.

Thus, the coils 13a and 13b corresponding to two units are integrated together, as illustrated in FIG. 5. This set of coils is attached into the input shaft-side housing portion 5a.

At this time, the recessed portions 15c of the yokes 15a and 15b and the protruding portions 14a of the yoke cover 14 axially abut against each other to regulate the position of the yoke cover 14 relative to the yokes 15a and 15b in the press fitting direction. Since the axial depth of the recessed portion 15c formed in to the yokes 15a and 15b is about half of the thickness of the yoke cover 14, the yokes 15a and 15b can be fitted by pressing in equal amounts.

Figure 6A:
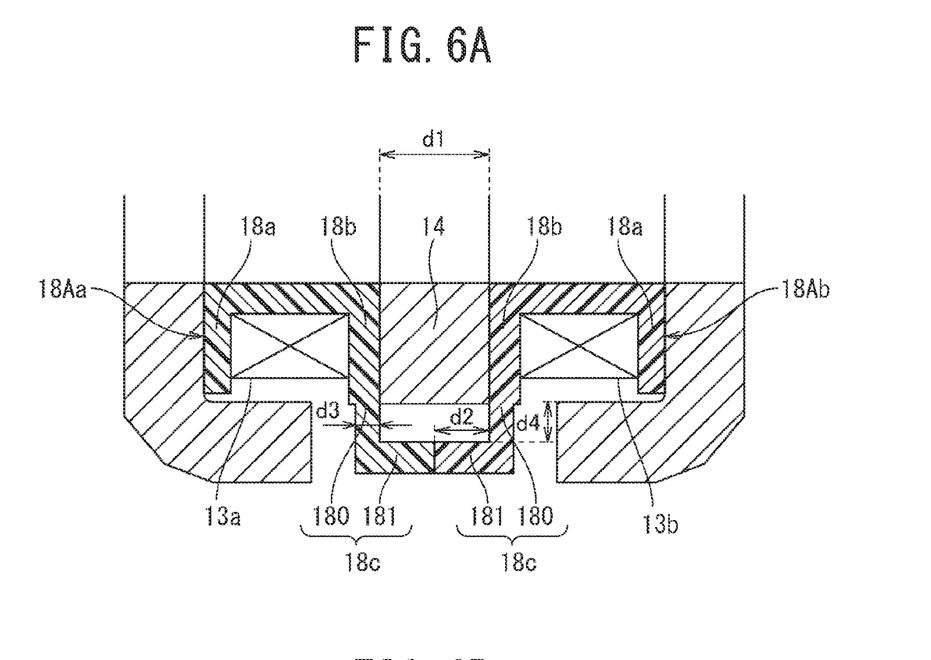
FIG. 6A is an axial partial sectional view of the torque detection unit according to the first embodiment.

Upon press fitting the yokes 15a and 15b, the axial distal end portion of the lug portion 181 of the pressing portion 18c in the coil bobbin 18Aa and the axial distal end portion of the lug portion 181 of the pressing portion 18c in the coil bobbin 18Ab abut against each other, as illustrated in FIG. 6A. Thus, in the coil bobbins 18Aa and 18Ab, the lug portions 181 of the coil bobbins axially push with each other so that base portions 180 of the coil bobbins bend axially and outward. The restoring forces of the bent base portions 180 generate press forces to press the lug portions 181 axially and inward. In other words, press forces to press the coil bobbins 18Aa and 18Ab axially and inward within the yokes 15a and 15b are generated. These press forces can be used to inhibit axial movement of the coil bobbins 18Aa and 18Ab to stably hold them in the yokes 15a and 15b.

Since a structure of pressing in the pressing portions 18c formed to project more radially and outward than the radial outer end portions of the flange portions 18b of the coil bobbins 18B is used, the coil bobbins 18A can be held without directly deforming the end faces (the axial outer end faces of the flange portions 18b) of the coil bobbins 18A.

The coil bobbins 18Aa and 18Ab are opposed to and combined with each other to align the coil-side terminals 18f on a line, and the coil-side terminals 18f are soldered into the through-holes for coil terminal connection of the circuit board 17.

Exemplary dimensions of the lug portions 181 will be described herein. The d1 in FIG. 6A is the axial thickness of the yoke cover 14 and is, as an example, 2.7 [mm]. The d2 in FIG. 6A is the axial length of the lug portion 181 and is, as an example, 1.45 [mm]. In other words, the total axial length of the two abutting lug portions 181 is 2.9 [mm] that is larger by 0.2 [mm] than the yoke cover thickness of 2.7 [mm]. This length of 0.2 [mm] corresponds to a tightening margin (bending margin).

The d3 in FIG. 6A is the axial thickness of a portion (hereinafter referred to as an "arm portion") of the lug portion 181 extending radially and outward and is, as an example, 0.6 [mm]. The d4 in FIG. 6A is the radial length of the arm portion and is, as an example, 0.7 [mm].

As an exemplary material of the lug portions 181, a material obtained by mixing PBT (polybutylene terephthalate) forming a base material with fiberglass by about 30 [wt %] is used. This material is highly resistant to heat and oil and can be imparted with flame retardance depending on its grade. As an exemplary material of the coil bobbins 18A according to the first embodiment, flame-retardant PBT is used.

A torque calculation circuit (not illustrated) of the torque sensor TS is mounted on the circuit board 17, detects voltages output from the two coils 13a and 13b and, in turn, detects a steering torque T applied to the steering wheel 31 and transmitted to the input shaft 37a, on the basis of the difference between the output voltages. In this manner, the torque sensor TS detects the relative displacement (rotational displacement) between the input shaft 37a and the output shaft 37b in response to changes in impedance of the pair of coils.

The steering torque T detected by the torque sensor TS is input to the controller of the EPS control unit 44. The controller receives not only the steering torque T but also a vehicle speed V to perform steering assist control in which a steering assist force depending on the steering torque T and the vehicle speed V is applied to a steering system. More specifically, a steering assist torque command value for generating the above-mentioned steering assist force in the electric motor 43 is calculated in accordance with a publicly known procedure to perform feedback control of a driving current to be supplied to the electric motor 43, using the calculated steering assist torque command value and the motor current detection value. Steering assist control is thus performed.

Although the foregoing description assumes that all the lug portions 181 of the pressing portions 18c of the coil bobbins 18Aa and 18Ab have equal axial lengths, the present invention is not limited to this structure, and the lug portions of one coil bobbin and the other coil bobbin axially opposed to each other may have different lengths, as long as these lug portions push each other during assembly.

Figure 6B:
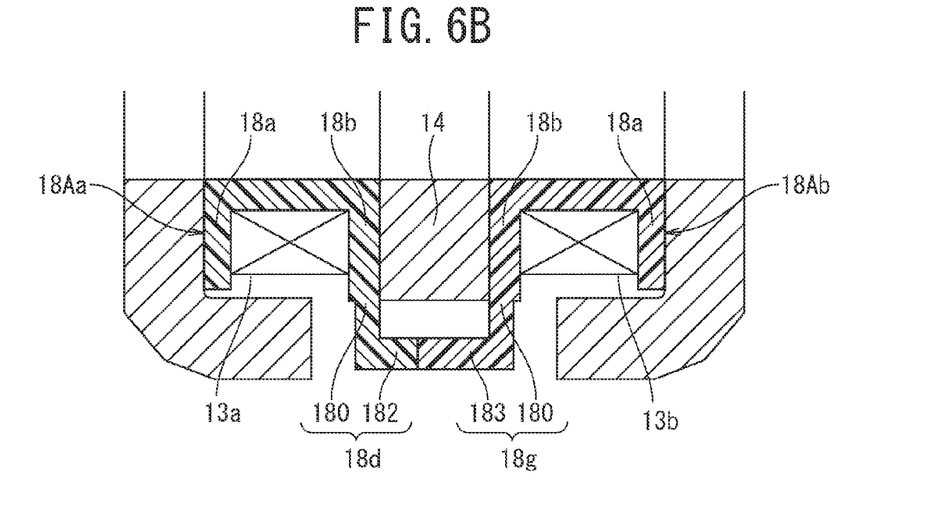
FIG. 6B is an axial partial sectional view illustrating a modification to FIG. 6A.

For example, as illustrated in a modification of FIG. 6B, the pressing portion 18c of the coil bobbin 18Aa may include a short lug portion 182 having an axial length shorter than that of the lug portion 181, and the pressing portion 18c of the coil bobbin 18Ab opposed to the short lug portion 182 may include a long lug portion 183 having an axial length longer than that of the lug portion 181. One of the two pressing portions 18c of the coil bobbin 18A may include a short lug portion 182, the other of them may include a long lug portion 183, and the two coil bobbins 18Aa and 18Ab may have the same shape to uniform the coil bobbins 18Aa and 18Ab, thus reducing the manufacturing cost.

In the foregoing description, the input shaft 37*a*, the output shaft 37*b*, and the torsion bar 30 correspond to rotating shafts, the coils 13*a* and 13*b* correspond to detection coils, and the yokes 15*a* and 15*b* correspond to electromagnetic yokes.

In the foregoing description, further, the base portions 180 correspond to first projecting portions, and the lug portion 181, the short lug portion 182, and the long lug portion 183 correspond to second projecting portions.

Effect of First Embodiment (1) In the torque sensor TS according to the first embodiment, two coil bobbins 18Aa and 18Ab around which a pair of coils 13*a* and 13*b*, the impedances of which change in opposite directions with each other depending on the torque generated in the rotating shaft, are wound are opposed, a yoke cover 14 is interposed between the coil bobbins 18Aa and 18Ab, and yokes 15*a* and 15*b* are fitted by pressing into both coil bobbins 18Aa and 18Ab from the two axial sides to integrate detection coils corresponding to two units. In addition, pressing portions 18*c* formed at a plurality of (in the first embodiment, two positions) circumferential positions in the flange portion 18*b* of the two coil bobbins 18Aa and 18Ab to project radially and outward from each position of the plurality of positions act on the two coil bobbins 18Aa and 18Ab to axially press the two coil bobbins 18Aa and 18Ab during the assembly.

With this structure, the pressing portions 18*c* formed to project radially and outward from the flange portions 18*b* can be used to axially press the coil bobbins 18Aa and 18Ab, around which the coils 13*a* and 13*b* are wound, to inhibit their axial movement.

This allows stable holding of the coil bobbins 18Aa and 18Ab in the yokes 15*a* and 15*b* without directly deforming the end faces of the coil bobbins 18Aa and 18Ab. This, in turn, allows less deformation of the detection coils than in the conventional techniques during assembly, thus reducing changes and variations in electrical characteristic of the detection coils due to the deformation.

(2) The pressing portion 18*c* includes a plurality of base portions 180 formed to project radially and outward from each position of a plurality of circumferential positions of the flange portion 18*b*, and a lug portion 181 projecting axially and outward from the outer peripheral edge portion of each base portion 180, and the lug portion 181 of the coil bobbin 18Aa and the lug portion 181 of the coil bobbin 18Ab abut against and push each other to axially press each of the coil bobbins 18Aa and 18Ab during the assembly.

With this structure, the lug portions 181 of the pressing portions 18*c* formed to project radially and outward from the flange portions 18*b* can be used to axially press the coil bobbins 18Aa and 18Ab, around which the coils 13*a* and 13*b* are wound, to hold the coil bobbins 18Aa and 18Ab in the yokes 15*a* and 15*b*.

This allows less deformation of the detection coils than in the conventional techniques. It is, therefore, possible to reduce changes and variations in electrical characteristic of the detection coils due to the deformation.

(3) The electric power steering device 3 and the vehicle 1 according to the first embodiment include a torque sensor TS.

This enables performing highly reliable steering assist control.

Second Embodiment

A second embodiment of the present invention will be described next.

The second embodiment is different from the above-described first embodiment in shape of the lug portions of the pressing portions, and the other configurations of both embodiments are the same.

Since the same reference numerals denote the same components as in the above-described first embodiment, a description thereof will be omitted as appropriate and only different portions will be described in detail hereinafter.

Figures 7A, 7B, 7C, 7D:
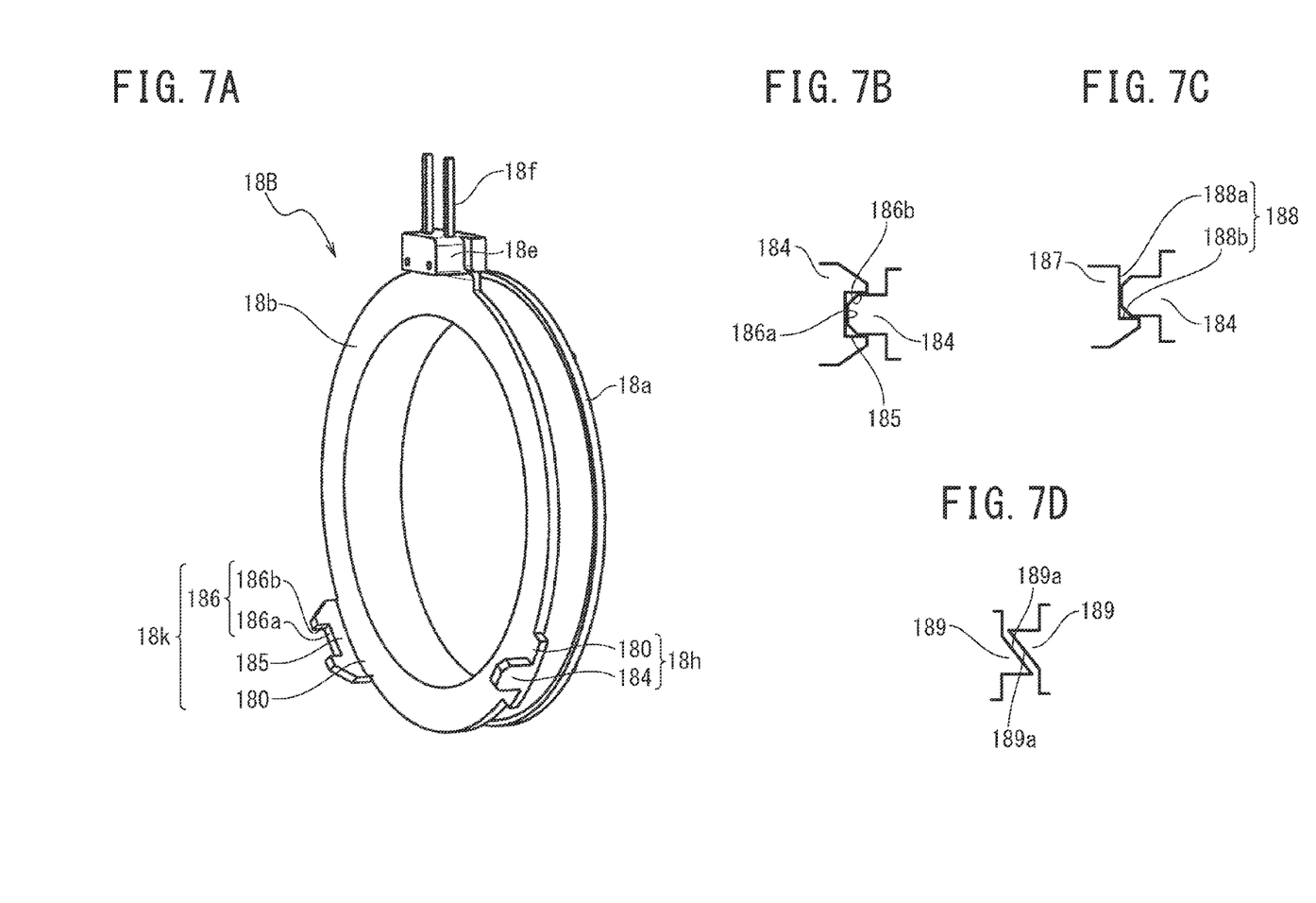
FIG. 7A is a perspective view illustrating a coil bobbin according to a second embodiment.
FIG. 7B is a partial side view of a second projecting portion according to the second embodiment.
FIGS. 7C and 7D are partial side views illustrating modifications of FIG. 7B.

Two coil bobbins 18B (18Ba and 18Bb if the coil bobbins are distinguished) according to the second embodiment respectively include two pressing portions 18*h* and 18*k*, as illustrated in FIG. 7A. The positions where the pressing portions are formed are the same as those in the above-described first embodiment. The pressing portions 18*h* and 18*k* are used in pairs, the number of which is selectable as appropriate, as long as at least one pair of pressing portions 18*h* and 18*k* are provided to one coil bobbin 18B.

The pressing portion 18*h* includes a base portion 180, and a rectangular flat lug portion 184 formed to project outward in the axial direction of the coil bobbin 18B from the circumferential central position of the radial outer end portion of the base portion 180. The lug portion 184 has the distal end portion which is the same in shape as that of the lug portion 181 in the above-described first embodiment and has an axial length longer than that of the lug portion 181.

The pressing portion 18*k* includes a base portion 180, a nearly trapezoidal flat lug portion 185 formed to project outward in the axial direction of the coil bobbin 18B from the radial outer end portion of the base portion 180, and a regulating portion 186 including a recessed portion formed at the circumferential central portion of the distal end portion (upper bottom portion) of the lug portion 185.

The regulating portion 186 includes a bottom portion 186*a* forming the recessed portion, and wall portions 186*b* standing upright on the two sides with the bottom portion 186*a* circumferentially interposed between them.

The circumferential width of the lug portion 184 is slightly smaller than that of the bottom portion 186*a* of the regulating portion 186. For example, this width is set to allow the axial distal end portion of the lug portion 184 to fit into the regulating portion 186 without backlash in the circumferential direction.

In the two coil bobbins 18B arranged on the same axis with flange portions 18*b* opposed to each other, the bottom portion 186*a* of one coil bobbin 18B and the axial distal end portion of the lug portion 184 of the other coil bobbin 18B are axially opposed to each other.

The axial length of each lug portion 184 of the coil bobbin 18B and the axial length of the bottom portion 186*a* of the regulating portion 186 of each lug portion 185 from the base portion 180 are set to be the lengths to the extent that the axial distal end portion of each lug portion 184 and the bottom portion 186*a* of each regulating portion 186 to abut against and push each other during assembly. This length is designed to enable obtaining axial press forces needed for stably holding the two coil bobbins 18B in yokes 15*a* and 15*b*.

With the above-mentioned structure, during assembly, the axial distal end portion of the lug portion 184 of one coil bobbin 18B is fitted into the regulating portion 186 of the other coil bobbin 18B to allow the axial distal end portion of the lug portion 184 and the bottom portion 186a of the regulating portion 186 to abut against and push each other, as illustrated in FIG. 7B. Thus, the base portions 180 bend axially and outward. The restoring forces of the bent base portions 180 press the two coil bobbins 18B axially and inward, as in the above-described first embodiment. This can inhibit axial movement of the two coil bobbins 18B to stably hold the two coil bobbins 18B in the yokes 15a and 15b.

Since a structure of axially pressing in the pressing portions 18h and 18k formed to project more radially and outward than the radial outer end portion of the flange portion 18b of the coil bobbin 18B is used, the coil bobbin 18B can be held without directly deforming the end face of the coil bobbin 18B (the axial outer end face of the flange portion 18b).

Fitting the axial distal end portion of the lug portion 184 into the regulating portion 186 inhibits circumferential (rotational) movement of the wall portions 186b between the two coil bobbins 18B. This can regulate the circumferential phase difference between the two coil bobbins 18B.

Although a structure including a regulating portion 186 having a recessed shape when the pressing portion 18k is viewed from the radial direction is used, the shape of the regulating portion is not limited to this structure.

For example, as illustrated in a modification of FIG. 7C, a structure may be used which includes a flat lug portion 187 formed to project outward in the axial direction of the coil bobbin 18B from the radial outer end portion of the base portion 180, and a stepped regulating portion 188 which has differences in circumferential height and is formed at the distal end portion of the lug portion 187. The regulating portion 188 includes a low-stepped portion 188a and a wall portion 188b which forms a high-stepped portion standing upright at one circumferential end portion of the low-stepped portion 188a, and the wall portion 188b can be used to regulate the phase difference between the two coil bobbins 18B in one direction of the circumferential direction between the two coil bobbins 18B.

Further, for example, as illustrated in a modification of FIG. 7D, each lug portion of the coil bobbin 18B may be formed of a lug portion 189 having a nearly right-angled triangular shape when viewed in the radial direction. The lug portion 189 includes a tapered surface 189a forming the hypotenuse of a right-angled triangle serving as a regulating portion. Thus, during the assembly, the two coil bobbins 18B can be axially pressed by the tapered surface 189a of one lug portion 189 of one coil bobbin of the two coil bobbins 18B and the tapered surface 189a of the other lug portion 189 of the other coil bobbin 18B axially abutting against and pushing with each other. It is also possible to inhibit circumferential movement between the two coil bobbins 18B using their tapered surfaces 189a to regulate the circumferential phase difference between them.

In the foregoing description, the input shaft 37a, the output shaft 37b, and the torsion bar 30 correspond to rotating shafts, the coils 13a and 13b correspond to detection coils, and the yokes 15a and 15b correspond to electromagnetic yokes.

In the foregoing description, further, the base portions 180 correspond to first projecting portions and the lug portions 184 and 185 correspond to second projecting portions.

Effect of Second Embodiment

The second embodiment has the following effect in addition to the effect of the above-described first embodiment.

(1) In the torque sensor TS according to the second embodiment, the pressing portion 18k includes in the lug portion 185, a regulating portion 186 which regulates the circumferential phase difference between the two coil bobbins 18B. More specifically, the lug portion 185 of each coil bobbin 18B includes a recessed portion at its axial distal end portion as the regulating portion 186, and the lug portion 184 of each coil bobbin 18B includes a jutting portion capable of fitting into the recessed portion of the regulating portion 186 and abutting against the bottom portion 186a of the recessed portion during fitting. The regulating portion 186 of one of the two coil bobbins 18B and the lug portion 184 of the other coil bobbin of the two coil bobbins 18B are fitted together and the bottom portion 186a and the axial distal end portion of the lug portion 184 abut against and push each other to axially press each coil bobbin 18B and regulate the circumferential phase difference between the respective coil bobbins 18B.

With this structure, the regulating portion 186 (recessed portion) of one of the two coil bobbins 18B and the lug portion 184 (jutting portion) of the other of the two coil bobbins 18B are fitted together so that the wall portions 186b at the two circumferential ends forming the regulating portion 186 regulate circumferential movement of the lug portion 184. It is, therefore, possible to regulate the circumferential (rotational) phase difference between the two coil bobbins 18B to improve the positional accuracy of the coil-side terminals 18f.

Third Embodiment

A third embodiment of the present invention will be described next.

The third embodiment provides a structure including a plurality of protrusions formed on the axial outer end face of the flange portion 18a of the coil bobbin 18 in the above-described first embodiment.

Since the same reference numerals denote the same components as in the above-described first embodiment, a description thereof will be omitted as appropriate and only different portions will be described in detail hereinafter.

Figure 8:
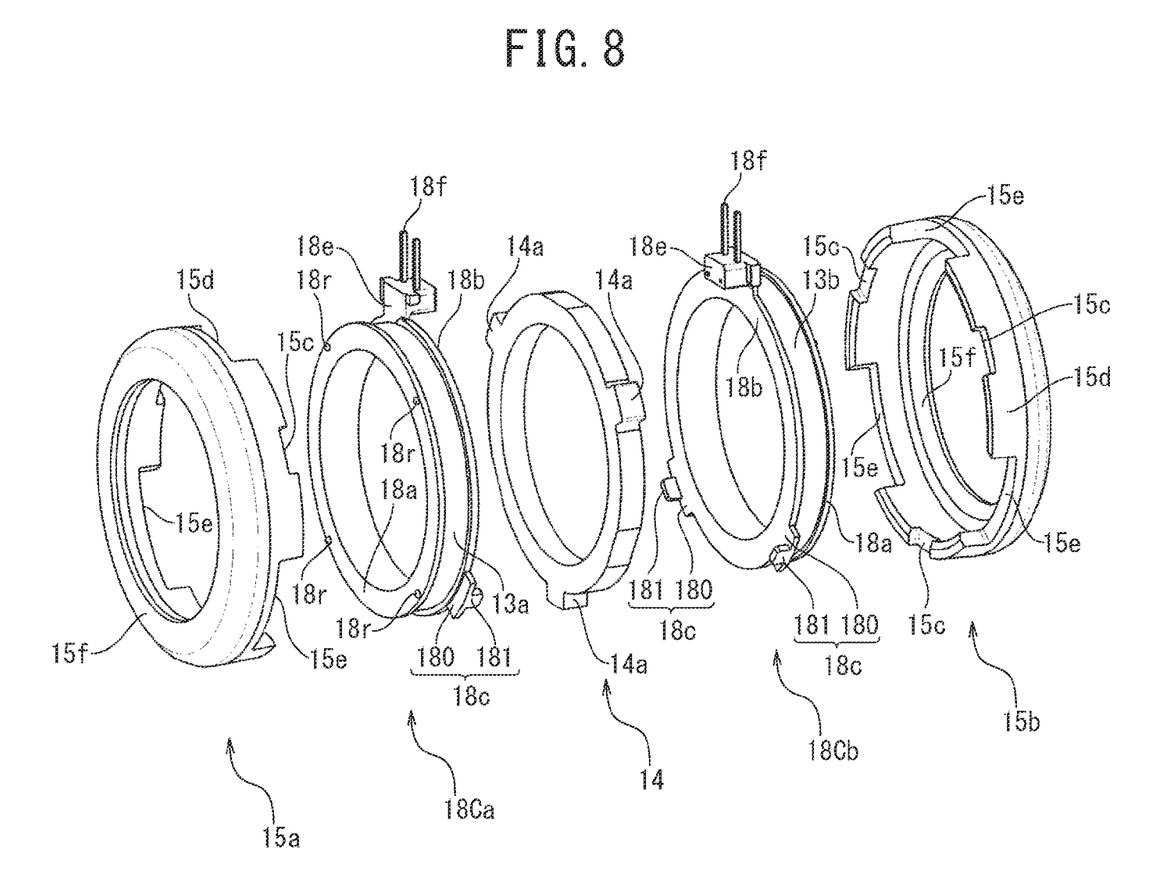
FIG. 8 is an exploded perspective view illustrating members included in a torque detection unit according to a third embodiment.

Each of coil bobbins 18Ca and 18Cb according to the third embodiment includes four protrusions 18r formed, in an axially and outward projecting manner, to the peripheral edge portion of the axial outer end face of a flange portion 18a, as illustrated in FIG. 8. The four protrusions 18r are equidistantly arranged in a circumferential direction.

The number of protrusions 18r is selectable as appropriate as long as at least four protrusions 18r are provided to one coil bobbin 18C.

The coil bobbins 18Ca and 18Cb will sometimes be referred to as "coil bobbins 18C" hereinafter when the coil bobbins 18Ca and 18Cb do not need to be distinguished.

Figure 9:
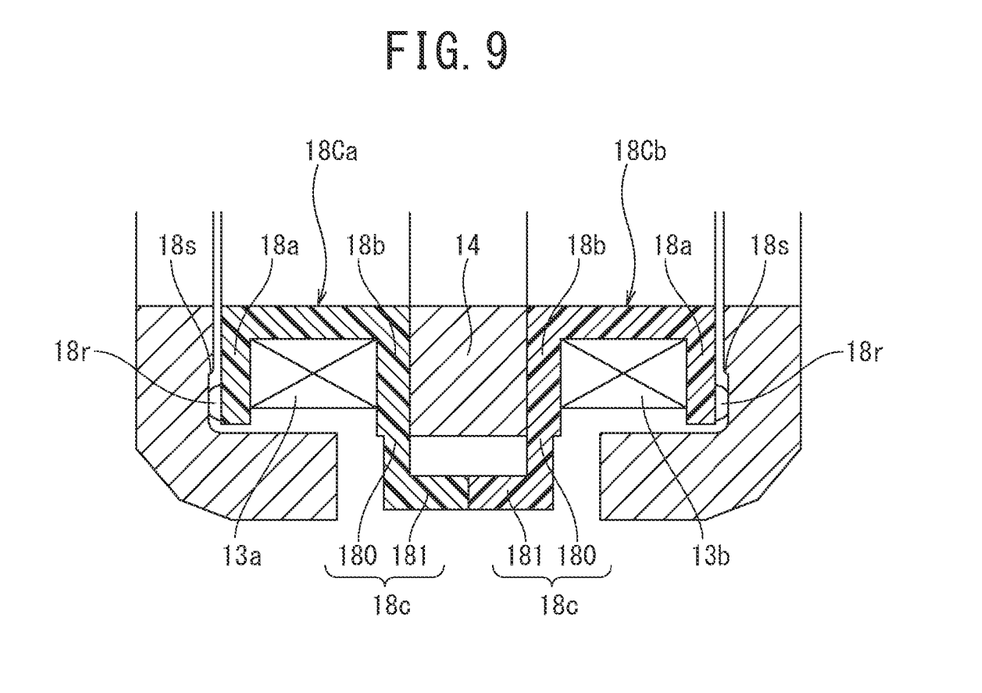
FIG. 9 is an axial partial sectional view of the torque detection unit according to the third embodiment.

With this structure, as illustrated in FIG. 9, during assembly, the two coil bobbins 18C are accommodated in yokes 15a and 15b, the protrusions 18r abut against bottom portions 15f of the yokes 15a and 15b so that the axial outer end faces of the flange portions 18a of the coil bobbins 18C bend inward, and the restoring forces of the bent end faces axially press the bottom portions 15f of the yokes 15a and 15b. In other words, the coil bobbins 18C press the bottom portions 15f through the protrusions 18r axially and outward.

In addition, the two coil bobbins 18C can be pressed axially and inward by allowing the axial distal end portions of lug portions 181 of pressing portions 18c of the coil bobbins 18C to abut against and push each other, as in the above-described first embodiment.

In other words, combining the axial inward press force produced by the protrusions 18r and the axial outward press force produced by the pressing portions 18c can more reliably inhibit axial movement of the coil bobbins 18C to more stably hold the two coil bobbins 18 in the yokes 15a and 15b. Further, combining both axial press forces allows less deformation of coils 13a and 13b by the protrusions 18r.

Effect of Third Embodiment

The third embodiment has the following effect in addition to the effect of the above-described first embodiment.

(1) The torque sensor TS according to the third embodiment includes a plurality of protrusions 18r which are formed at a plurality of circumferential positions on the axial outer end face of the flange portions 18a of the coil bobbins 18Ca and 18Cb and axially press the two yokes 15a and 15b during assembly.

With this structure, during assembly, the protrusions 18r abut against the bottom portions 15f of the yokes 15a and 15b so that the end faces of the coil bobbins 18Ca and 18Cb bend inwards, and the restoring forces of the bent end faces can be used to press the coil bobbins 18Ca and 18Cb against the bottom portions 15f of the yokes 15a and 15b through the protrusions 18r.

This can combine the axial press force produced by the protrusions 18r and the axial press force produced by the pressing portions 18c to more reliably inhibit axial movement of the coil bobbins 18Ca and 18Cb and to more stably hold the coil bobbins 18Ca and 18Cb in the yokes 15a and 15b. Further, combining the axial press forces produced by the pressing portions 18c and the protrusions 18r allows less deformation of the coils 13a and 13b by the protrusions 18r.

(Modification)

(1) In each of the above-described embodiments, one pair of coils 13a and 13b are used as coils for the torque detection unit 10, but the present invention is not limited to this structure, and two or more pairs of coils may be used.

(2) In each of the above-described embodiments, a structure that the EPS control unit 44 is fixed/supported to/by the housing of the electric motor 43 has been taken as an example, but the present invention is not limited to this structure, and other structures of locating the EPS control unit 44 at a position different from that of the housing of the electric motor 43 as a separate unit, may be used.

(3) In each of the above-described embodiments, a three-phase brushless motor has been taken as an example of the electric motor 43, but the present invention is not limited to this structure, and other structures, such as the electric motor 43 implemented by a brushless motor of four or more phases or a brush motor, may be used.

This application claims priority based on Japanese Patent Application No. P2015-099017 (filed on May 14, 2015), the entire contents of which are hereby incorporated by reference.

Although the present invention has been described herein with reference to a limited number of embodiments, the scope of protection is not limited thereto, and alterations to each embodiment based on the above disclosure are obvious to those skilled in the art.

REFERENCE SIGNS LIST

1 . . . Vehicle, 3 . . . Electric power steering device, 5 . . . Housing, 5a . . . Input shaft-side housing portion, 5b . . . Output shaft-side housing portion, 7 . . . Worm wheel, 8 . . . Worm, TS . . . Torque sensor, 10 . . . Torque detection unit, 11 . . . Sensor shaft portion, 12 . . . Cylindrical member, 13a, 13b . . . Coil, 14 . . . Yoke cover, 15a, 15b . . . Yoke, 17 . . . Circuit board, 18A, 18B, 18C . . . Coil bobbin, 18a, 18b . . . Flange portion, 18c, 18d, 18g, 18h, 18k, 18p, 18q . . . Pressing portion, 18e . . . Terminal mount portion, 18f . . . Coil-side terminal, 30 . . . Torsion bar, 37a . . . Input shaft, 37b . . . Output shaft, 180 . . . Base portion, 181, 184, 189 . . . Lug portion, 186, 188 . . . Regulating portion, 189a . . . Tapered surface

The invention claimed is:

1. A torque detection device comprising:
   a pair of detection coils, impedances of which change in a direction opposite to each other depending on a torque generated in a rotating shaft;
   a torque calculation circuit configured to calculate the torque on the basis of voltages output from the detection coils;
   reel coil bobbins around which the pair of detection coils are respectively wound;
   electromagnetic yokes comprising cylindrical portions which respectively hold the two coil bobbins fitted thereinto;
   one yoke cover fitted by pressing into inner diameters of the cylindrical portions of the two electromagnetic yokes at an intermediate position between the two electromagnetic yokes axially opposed to each other; and
   pressing portions which are formed to project radially and outward at a plurality of circumferential positions of a radial outer end portion of respective flange portions of the two coil bobbins, and act between the two coil bobbins to axially press the two coil bobbins during assembly.

2. The torque detection device according to claim 1, wherein the pressing portions comprise a plurality of first projecting portions formed to project radially and outward from the plurality of circumferential positions and a second projecting portion projecting axially and outward from a radial outer end portion of each of the first projecting portions, and the second projecting portion of one of the coil bobbins and the second projecting portion of the other coil bobbin axially abut against and push with each other to axially press the two coil bobbins during the assembly.

3. The torque detection device according to claim 2, wherein the pressing portion comprises in the second projecting portion, a regulating portion which regulates a circumferential phase difference between the two coil bobbins.

4. The torque detection device according to claim 3, wherein
   one part of the second projecting portion of the two coil bobbins comprises a recessed portion at an axial distal end portion as the regulating portion, and the other part of the second projecting portion of the two coil bobbins comprises a jutting portion configured to be able to fit into the recessed portion and abut against a bottom portion of the recessed portion during fitting, and
   the recessed portion of one of the coil bobbins and the jutting portion of the other coil bobbin are fitted together and the bottom portion of the recessed portion and the jutting portion abut against and push with each other to axially press the two coil bobbins and regulate the circumferential phase difference between the two coil bobbins during the assembly.

5. The torque detection device according to claim 1, comprising a plurality of protrusions which are formed at a plurality of circumferential positions of an axial outer end face of the two coil bobbins and axially press the two electromagnetic yokes during the assembly.

6. A power steering device comprising the torque detection device according to claim 1.

7. A vehicle comprising the torque detection device according to claim 1.

* * * * *